United States Patent [19]
Keller et al.

[11] Patent Number: 5,463,622
[45] Date of Patent: Oct. 31, 1995

[54] CONTROL UNIT FOR THE COMMON MEMORY OF AN ATM NODE

[75] Inventors: Hansjoerg Keller, Toffen; Sathyanarayana Rao, Bern; Heinz-Christoph Schuerch, Wabern, all of Switzerland

[73] Assignee: Ascom Tech AG, Bern, Switzerland

[21] Appl. No.: 768,677

[22] Filed: Oct. 9, 1991

[30] Foreign Application Priority Data

Mar. 2, 1990 [CH] Switzerland ............................... 665/90

[51] Int. Cl.$^6$ ................................................. H04L 12/56
[52] U.S. Cl. ........................................ 370/60.1; 370/94.1
[58] Field of Search ............................... 370/60, 60.1, 82, 370/94.1; 340/825.51

[56] References Cited

U.S. PATENT DOCUMENTS 4,947,388  8/1990  Kuwahara et al. ..................... 370/94.1

*Primary Examiner*—Benedict V. Safourek
*Attorney, Agent, or Firm*—McAulay Fisher Nissen Goldberg & Kiel

[57] ABSTRACT

An apparatus and method for controlling the common memory of an ATM-node. The nodes serve for the continuous reception and onward routing of address-labelled cells with uniform length and uniform construction. The apparatus includes means for management and control and a sequencer for managing the storage blocks of the common memory and for controlling the sequential reading in and reading out of cells, respectively, into or out of said storage blocks. The circuits for management and control include at least one addressable read/write store, a monitor logic, an input logic, a bus- and control-logic, and a comparator, the read/write store includes a number of storage locations equal to the third plurality plus two times the second plurality multiplied by the quantity, plus 2. Every storage location of the read/write store is constructed for storing an address. Two times the second plurality of the storage locations multiplied by the quantity is associated in pairs with the outgoing lines, and the third plurality of storage locations is associated with the storage blocks of the common memory. Two of the storage locations are associated with the empty storage blocks of the common memory. The method includes providing lists for each queue and empty storage blocks the common memory. Each list has a head element and a tail element. The elements of the lists are addresses and the total of all the elements of all of the lists is constant and is equal to the number of the storage blocks of the common memory. The method also includes appending a current head element of the list of the empty storage blocks as a new tail element of the list of empty storage blocks when storing a cell to the common memory, and appending a current head element of a list associated with a queue in the common memory as a new tail element of the list of the empty storage blocks.

28 Claims, 9 Drawing Sheets

COMMON MEMORY 27

|   | A | B | C | D | E | - - - - |
|---|---|---|---|---|---|---|
| a | 01 | 02 | 03 | 04 | 05 | |
| b | $Z\alpha 1$ | 08 | $Z\alpha 2$ | $Z\alpha 3$ | 09 | |
| c | $Z\beta 1$ | 010 | 07 | $Z\delta 1$ | 011 | |
| d | $Z\beta 2$ | $Z\delta 3$ | $Z\delta 4$ | $Z\delta 5$ | $Z\delta 7$ | |
| e | $Z\delta 2$ | 06 | 012 | $Z\mu 1$ | $Z\delta 6$ | |
| . | | | | | | |
| . | | | | | | |
| . | | | | | | |

FIG. 5

COMMON MEMORY 27

| QUEUE 0 | | QUEUE α | | QUEUE β | | QUEUE δ | | QUEUE μ | |
|---|---|---|---|---|---|---|---|---|---|
| Aa | : 01 | Ab | : $Z\alpha1$ | Ac | : $Z\beta1$ | Dc | : $Z\delta1$ | De | : $Z\mu1$ |
| Ba | : 02 | Cb | : $Z\alpha2$ | Ad | : $Z\beta2$ | Ae | : $Z\delta2$ | | |
| Ca | : 03 | Db | : $Z\alpha3$ | | | Bd | : $Z\delta3$ | | |
| Da | : 04 | | | | | Cd | : $Z\delta4$ | | |
| Ea | : 05 | | | | | Dd | : $Z\delta5$ | | |
| Be | : 06 | | | | | Ee | : $Z\delta6$ | | |
| Cc | : 07 | | | | | Ed | : $Z\delta7$ | | |
| Bb | : 08 | | | | | Aa | : $Z\delta8$ | | |
| Eb | : 09 | | | | | | | | |
| Bc | : 010 | | | | | | | | |
| Ec | : 011 | | | | | | | | |
| Ce | : 012 | | | | | | | | |
| Dc | : 013 | | | | | | | | |

FIG. 6

P - STORE 45

| List 0 | | List α | | List β | | List δ | | List μ | |
|---|---|---|---|---|---|---|---|---|---|
| Aa | : Ba | Ab | : Cb | Ac | : Ad | Dc | : Ae | De | : |
| Ba | : Ca | Cb | : Db | Ad | : | Ae | : Bd | | |
| Ca | : Da | Db | : | | | Bd | : Cd | | |
| Da | : Ea | | | | | Cd | : Dd | | |
| Ea | : Be | | | | | Dd | : Ee | | |
| Be | : Cc | | | | | Ee | : Ed | | |
| Cc | : Bb | | | | | Ed | : Aa | | |
| Bb | : Eb | | | | | | | | |
| Eb | : Bc | | | | | | | | |
| Bc | : Ec | | | | | | | | |
| Ec | : Ce | | | | | | | | |
| Ce | : Dc | | | | | | | | |

FIG. 7

CONTROL UNIT FOR THE COMMON MEMORY OF AN ATM NODE

BACKGROUND OF THE INVENTION

1. Field of the Invention

This invention concerns the control unit which is used for the control of the common memory of an ATM node, whereby the ATM-node is connected to a first plurality of incoming lines and to a second plurality of outgoing lines. The ATM-node serves for the continuous reception and onward routing of address-labelled cells with uniform length and uniform construction, which cells arrive or leave over the lines, and to which cells a number of distinguishable priorities are associated. The common memory serves for the intermediate storage of all cells which should be sent out on one of the outgoing lines. Additionally, the common memory has a third plurality of storage blocks, which are individually selectable by addresses and each of which serves respectively for the reception of a cell. The control unit comprises means for management and control as well as a sequencer, with whose help the storage blocks of the common memory are managed and the sequential reading in and reading out of cells, respectively into or out of the storage blocks is controlled. It further concerns the method of operation of the node.

The term ATM (Asynchronous Transfer Mode) is known for a technique for broadband communication in the region of about 155 to 622 Mbit/s and much more. The technique is considered as a type of packet switching, in which all the packets are address-labelled and have a uniform length. Hereafter, these packets are termed "cells" in conformance with other literature.

ATM nodes serve to route cells to the required destination as is generally described by means of FIG. 1, later.

2. Description of Prior Art

ATM nodes can be constructed in many different ways. The type which employ a common memory in accordance with the patent BE 904 100, seem to be particularly advantageous since, with this technique, the problem of the blocking of one of the output links, or even the whole node can be easily overcome.

One of this type of ATM node is known in detail from the document EP-A-299 473. This node has a main memory, via which all cells are sent out, an address-pointer store for the management of the addresses in the main memory and a third store for the management of the empty entries in the main memory (the idle address FIFO). The address-pointer store comprises primarily a whole series of registers. These registers are associated uniquely with the outgoing lines. They serve, respectively, for the storage of the addresses of the storage blocks in the main memory in which are stored either the cells which must be sent out next on the respective associated outgoing line, or into which the next arriving cells should be stored. The information about how many cells are stored, and in which storage blocks, is associated with the respective cells and stored with them in the main memory. Therefore, direct access cannot be made to this information.

A further document EP-A-336 373 from the same applicant, describes a very similar ATM node, in which the emphasis is placed on a so-called multicast facility, ie. the possibility for certain cells to be sent not only respectively to just one single address, but to any number of freely selectable addresses.

The structure of the known ATM node is such that the real storage function of the main memory is combined with the logic and control functions for locating where cells are to be stored into, or read out from. This is a substantial handicap, that manifests itself in the form of logic which is difficult to understand and is inflexible. In particular, this structure necessitates the use of VLSI (Very Large Scale Integration)—or custom-chips, which require a considerable amount of development effort.

SUMMARY OF THE INVENTION

It is the purpose of this invention to provide a cheaper and more-flexible solution, with which it should be possible to create an ATM-node which has a clearer structure and a considerably simpler—and therefore cheaper and more reliable—operation functionality. Furthermore, the actual construction should be possible with less complicated integrated circuits.

In the following, the invention is described in more detail by means of examples with the help of eleven figures. They show:

DESCRIPTION OF THE PREFERRED EMBODIMENTS

Figure 1:
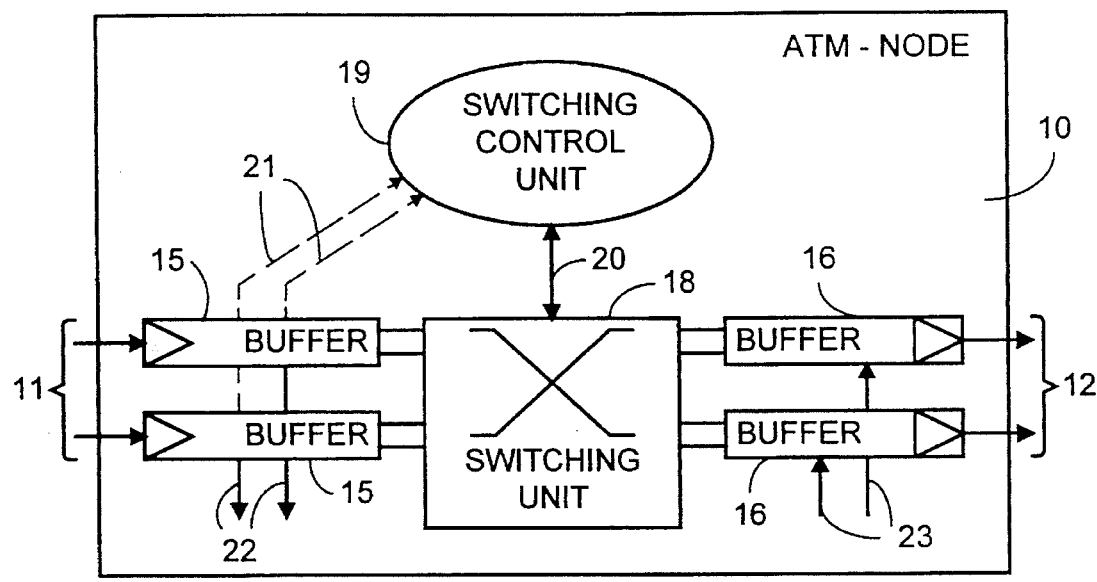
FIG. 1—General Structure of an ATM-Node (current state-of-the-art)

FIG. 1 shows a very general block diagram of an ATM-node 10. To this node are connected a first plurality n of incoming lines 11 and a second plurality m of outgoing lines 12. n and m can be equal or unequal, and can have a value from two up to several hundred. Cells destined for the outgoing lines 12, can have several different priorities p.

Every incoming line 11 connects to a buffer 15, and every outgoing line 12 is preceded by a buffer 16. Lines 11,12 are connected via these buffers 15, 16 to a switching unit 18. This switching unit 18 is controlled by a switching control unit 19, as shown by the bidirectional arrow 20.

Address-labelled packets of uniform length arrive continuously at the ATM-node 10 on the incoming lines 11. These packets are hereafter termed "cells" (Z). (A cell typically consists of a header of 5 bytes, or octets, followed by 48 octets of user information). From the header of these cells Z, the switching control unit extracts primarily the necessary control information (header information) from which is determined on which outgoing lines 12 the respective cell Z should be sent, and the new header for the transmitted cell. This action is shown by the dotted arrows 21. Cells Z which contain no user information, (so-called empty cells) are removed from the buffers 15, as shown by the arrows 22. On the other hand, when there are no cells Z to send out on the outgoing lines 12, empty cells are transmitted instead, as shown by the arrows 23. Cells can be sent out in a multicast manner or as a general broadcast, and also on several pre-determined lines or on all of them.

The ATM-node 10 performs the functions of a switching exchange for the continuous onward routing of incoming cells Z to outgoing lines 12, in accordance with the description. Of course, in this respect, consideration must be given to the associated requirement that, whenever possible, no cell-loss should occur.

Figure 2:
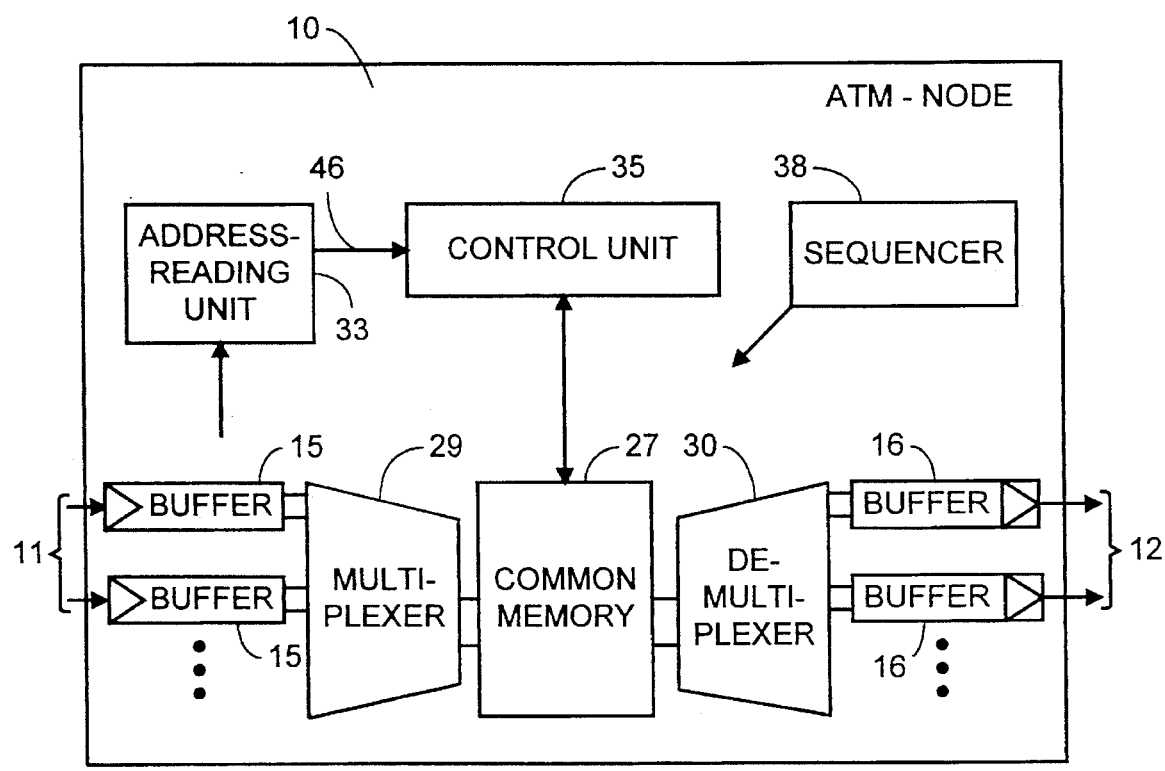
FIG. 2—Block Diagram of an ATM-Node with Common Memory (current state-of-the-art)

FIG. 2 shows the block diagram of one such ATM-node 10, which has a common memory 27, with a third plurality k of storage blocks. Basically, every arriving cell Z is stored in this common memory 27, before being sent out again on one of the outgoing lines 12. By means of its extensive buffering capability, this common memory 27 prevents cell-loss and is preferably arranged so that, in a sequential manner, only one single cell Z can be written in or read out, respectively, at a time. ie. it operates serially. To achieve this, a multiplexer 29 is inserted between the buffers 15 on the incoming-side and the common memory 27. This takes data from the input buffers 15 in a cyclic order.

In a similar manner as at the incoming-side of the ATM-node 10, a demultiplexer 30 is inserted between the common memory 27 and the buffers 16 for the outgoing lines 12. This demultiplexer routes cells Z read out of the common memory 27, to the respective outgoing lines 12, as had been determined at the incoming-side from the reading of the header information by the address-reading unit 33.

The common memory 27 is controlled by a control unit 35 which receives the necessary control information exclusively from the address-reading unit 33. Finally a sequencer 38 serves to co-ordinate the units of the ATM-node 10 with the common memory 27. The sequencer triggers the individual function steps of the various units and synchronises them to each other.

Figure 3:
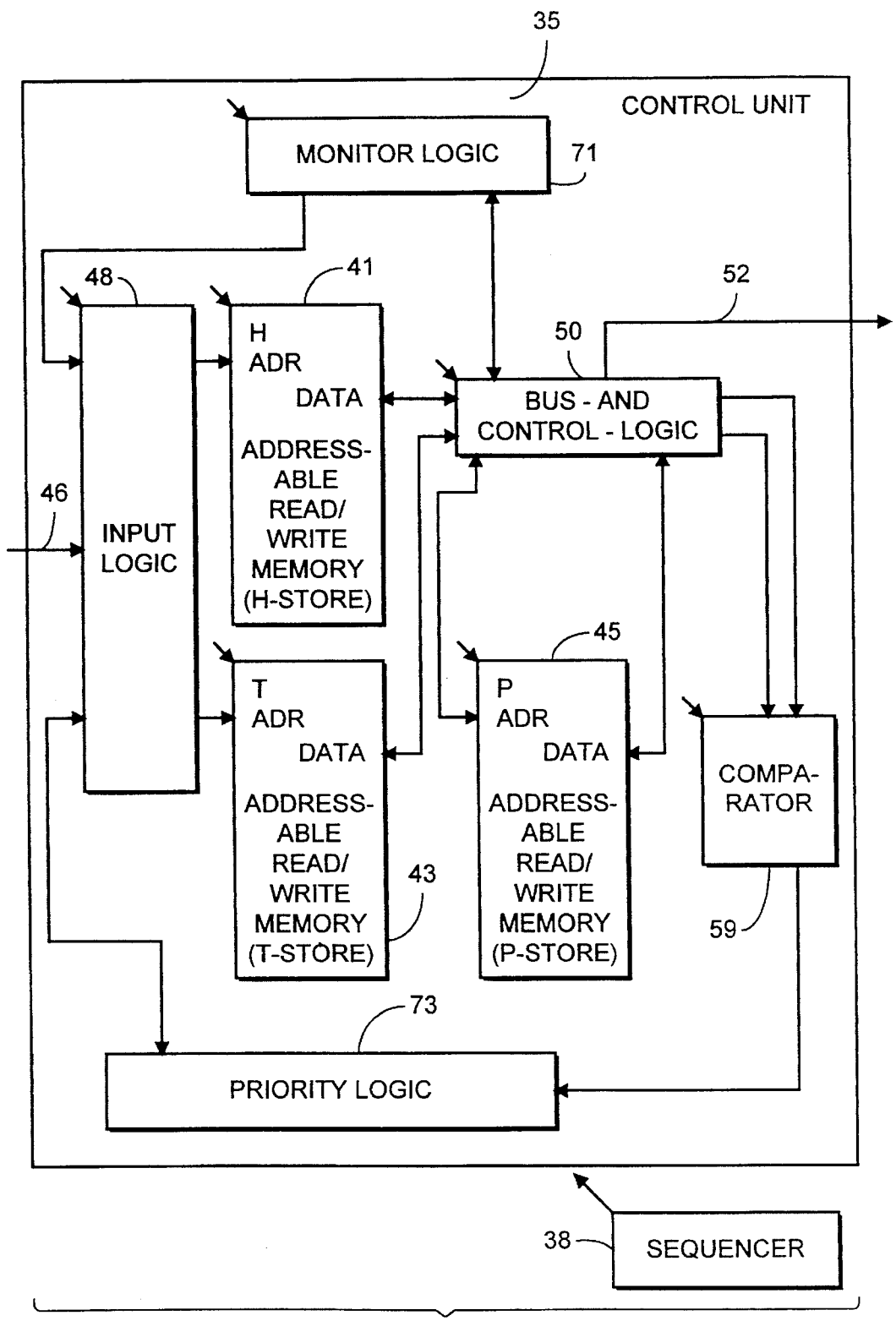
FIG. 3—Block Diagram of a Control Unit for the Common Memory

FIG. 3 shows the block diagram of the control unit 35 and the sequencer 38, which were shown in FIG. 2. The most important units of the control unit 35 are three addressable read/write memories 41, 43, 45, (preferably RAMs—random access memories). Each has an index address input line Adr and an input/output line Data for storing data into the storage locations.

The first read/write memory 41 is called hereafter the H-store (H=head). It contains m+1 storage locations, where m is the term for the second plurality of outgoing lines 12. (In the following example m=4). The storage locations of the H-store are individually associated, each with one of these outgoing lines 12, and denoted by the greek letters α β,∂,μ. In addition, there is a (m+1)th location denoted by O, which is associated with a list of the empty locations (as described later).

The content of the storage locations O, α,β,∂,μ of the H-store 41 is respectively an address of a header element (as described later).

The H-store 41 is further regulated by the sequencer 38 and a pointer controller depending upon the incoming cells, whereby the contents of the storage locations α,β, ∂,μ are respectively written in or read out (as described later). The storage location O receives, respectively, special treatment.

The second read/write memory 43 is called hereafter the T-store (T=tail). It is constructed in a similar way to the H-store. Its storage locations are likewise denoted in accordance with the greek letters or, α,β,∂,μ, together with 0. The content of the storage locations is also, respectively, an address. However, the pointer controller selects the storage locations in a cyclic manner.

The third read/write memory 45 is called hereafter the P-store (P=pointer). It builds an image of the common memory 27. It contains the same number k of storage locations as there are storage blocks in the common memory 27. The storage locations and the storage blocks have, pair-wise, the same address. The difference between the two stores is that a content of the storage locations of the P-store is a (short) address, whereas the respective content of the storage blocks of the common memory 27 is a (long) cell Z.

In addition, the control unit 35 contains a control information input 46, input logic 48, bus- and control- logic 50, an output 52, a comparator 59, monitor logic 71 and priority logic 73. All these units are switched on, or triggered, sequentially, by means of the sequencer 38, as indicated by the angled arrows.

The input logic 48 makes the connection between the control information input 46 (coming from the address reading unit 33, FIG. 2), the monitor logic 71 as well as the priority logic 73, and the address input lines Adr of the H-store 41 and the T-store 43.

Figure 4:
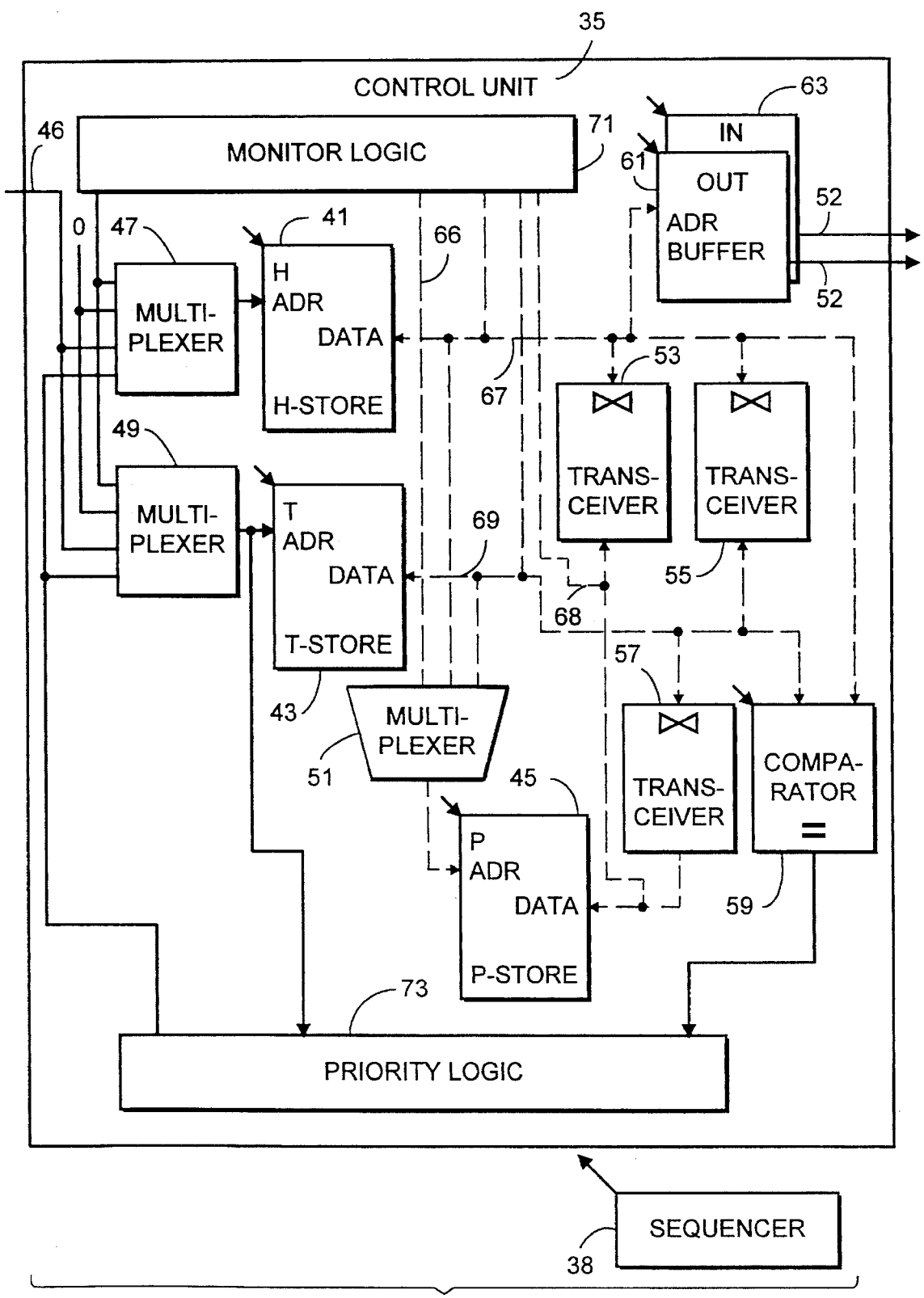
FIG. 4—Block Diagram of the Control Unit with details of the Bus- and Control-Logic FIG. 5—Example of the structure and content of the Common Memory FIG. 6—Content of the Common Memory in the form of Queues FIG. 7—Content of the P-store in the form of Lists FIG. 8—Sequence diagram for the sending out of a cell from the Common Memory FIG. 9—Sequence diagram for the storing of a cell into the Common Memory FIG. 10—Block Diagram of a Priority Logic FIG. 11—Block Diagram of a Multicast Logic

FIG. 4 shows the bus- and control- logic 50 in more detail. The following discussion makes reference to items depicted in FIGS. 3 and 4. This logic 50 consists of a number of co-ordinated buses 66, 67, 68, 69 and of control elements such as multiplexers 51 and transceivers 53, 55, 57 inserted inbetween. The logic 50 connects the input and output Data lines of the H-store 41 and the T-store 43 with both input lines (Adr and Data) of the P-store 45, with the monitor logic 71, with the comparator 59 and with the output 52. The path to the output 52 is via two more output buffers 61, 63. The output 52 itself is a uni-directional bus which goes to the common memory 27, where it is connected to the address input line. The input logic 48 consists essentially of two signal multiplexers 47, 49 which co-ordinate respectively the address signals for the H-store 41 and the T-store 43. The inputs shown as 0 on the multiplexers 47, 49 are for selecting the list of empty locations.

The priority logic 73, which is described more thoroughly later, is an option for the control unit 35. It only has any relevance when cells Z are associated with different priorities for being forwarded, e.g. "urgent" and "normal". At first, however, only cells with a single priority are considered.

The way in which the common memory 27—and the appertaining control unit 35—operate is described by means of an example in the next figures, which is associated with the state of the stores at particular instances. In addition, FIG. 5 shows the addresses and the current content of the storage blocks of the common memory 27. As an example, is memory can be constructed as a grid, whereby the columns are associated with the addresses A, B, C, D, E, . . . and the rows are associated with the addresses a, b, c, d, e, . . . For practical reasons, only the content of the twenty-five storage blocks with block addresses Aa to Ee are shown.

The content of the storage blocks of the common memory 27 form—as described—intermediately stored cells Z, or else the content is empty. In the latter case, the block is marked with a O plus a sequence number 1, 2, 3, . . . In the other case, ie. when a cell Z is stored, the block is marked with a Z (for cell), a greek letter $\alpha,\beta,\partial,\mu$, as well as a sequence number 1, 2, 3, . . . The letters $\alpha,\beta,\partial,\mu$, denote on which outgoing line 12 the respective cell Z must be sent. The sequence numbers denote the chronological order in which the cells Z were written into the common memory 27, sorted according to the outgoing line 12. In this way, the cell, Z waiting to be sent out, form a queue for each outgoing line 12 ($\alpha,\beta,\partial,\mu$). The chronological order of the queue is recognized by the sequence number. In addition, there are the number of empty locations. These represent the amount of empty (ie. available) storage blocks.

FIG. 6 shows, as queues, the empty locations O and the stored cells Z in the common memory 27, at the particular moment in question. The queue of empty locations 0 comprises 12 empty locations, 01 to 012, in which 01 is the "oldest" empty location and forms the head H of the queue and 01 2 is the "youngest" empty location and forms the tail T of the queue.

The addresses in which the empty locations can be found are given at the left hand side of the empty locations. Specifically, the queue of empty locations O indicates which storage blocks of the common memory 27 are empty and in which order they are made available for use. The thirteenth empty location 013, which lies below the horizontal line, is not considered at this stage.

The queue of cells Z to be sent out from the common memory 27 onto the outgoing line $\alpha$, comprises three cells; $Z\alpha 1$ to $Z\alpha 3$. The corresponding queue for line $\beta$, comprises two cells; $Z\beta 1$, $Z\beta 2$, the queue for line $\partial$, has seven cells; $Z\partial 1$ to $Z\partial 7$ (being below the horizontal line, the eigth cell $Z\partial 8$ is not yet considered as existing), and the queue for line $\mu$, has a single cell; $Z\mu 1$. In every queue, the lowest sequence number (oldest cell) indicates the head H and the highest sequence number (youngest cell) indicates the tail T.

The addresses Aa to Ee which are associated with the storage blocks of the common memory 27 in which the cells Z are stored, or are empty, are given at the left hand side of the cells in the queues. The storage blocks either contain cells Z or are empty. All the queues together correspond to the twenty-five storage blocks in the example in FIG. 5. ie. in every storage block of the common memory 27, there is either a cell waiting to be sent out ($Z\alpha 1$–$Z\alpha 3$, $Z\beta 1$–$Z\beta 2$, $Z\partial 1$–$Z\partial 7$, $Z\mu 1$) or the storage block is empty. In this respect, it should be noted that (for a reason described later) in the queues $\alpha$, $\beta,\partial,\mu$, the respective cells with the lowest sequence number (ie. the cells $Z\alpha 1$, $Z\beta 1$, $Z\partial 1$ and $Z\mu 1$) are deemed to have already been sent. In particular, the queue $\mu$, with just one single cell $Z\mu 1$, is consequently empty. This queue thus corresponds to having no cell Z still to send out of the common memory 27.

FIG. 7 shows a representation of the associated lists in the P-store 45, which correspond to the situation in FIG. 6. The elements of these lists (in the right hand side columns) are addresses Aa to Ee, which are stored in the storage locations of the P-store 45. The addresses Aa to Ee of these storage locations of the P-store are given in the left hand side columns. These addresses are identical to the addresses of the associated cells Z in the storage blocks of the common memory 27 (FIG. 6).

The addresses therefore appear three times as a set of distinguishable addresses; firstly as addresses of the storage blocks of the common memory 27, secondly as addresses of the storage locations of the P-store 45, and thirdly as contents of the storage locations of the P-store 45.

The P-store 45, care is taken that fundamentally the content of a storage location is never the same as the associated address. In this way, the content of every storage location denotes an address where the next respective associated element of the respective list $O,\alpha,\beta,\partial,\mu$ is stored. The lists in the P-store 45 are therefore lists of pointers, which exclusively establish a respective sequence.

The information as to which element of the lists in the P-store 45 is the head H or the tail T is not contained in the P-store 45. On the contrary, this information is in the H-store or the T-store respectively. Therefore, the three stores 41, 43, 45 together are required to obtain the complete information about the lists in the P-store 45.

Since the queues of the common memory 27 are associated, by their addresses, with the lists in the P-store 45, the information in the three stores 41, 43, 45 also provides the information about the sequences in the queues. The content of the P-store 45 therefore denotes in which blocks of the common memory 27 the incoming cells are intermediately stored and in which order, and on which outgoing line 12, they should be sent out again.

Figure 8:
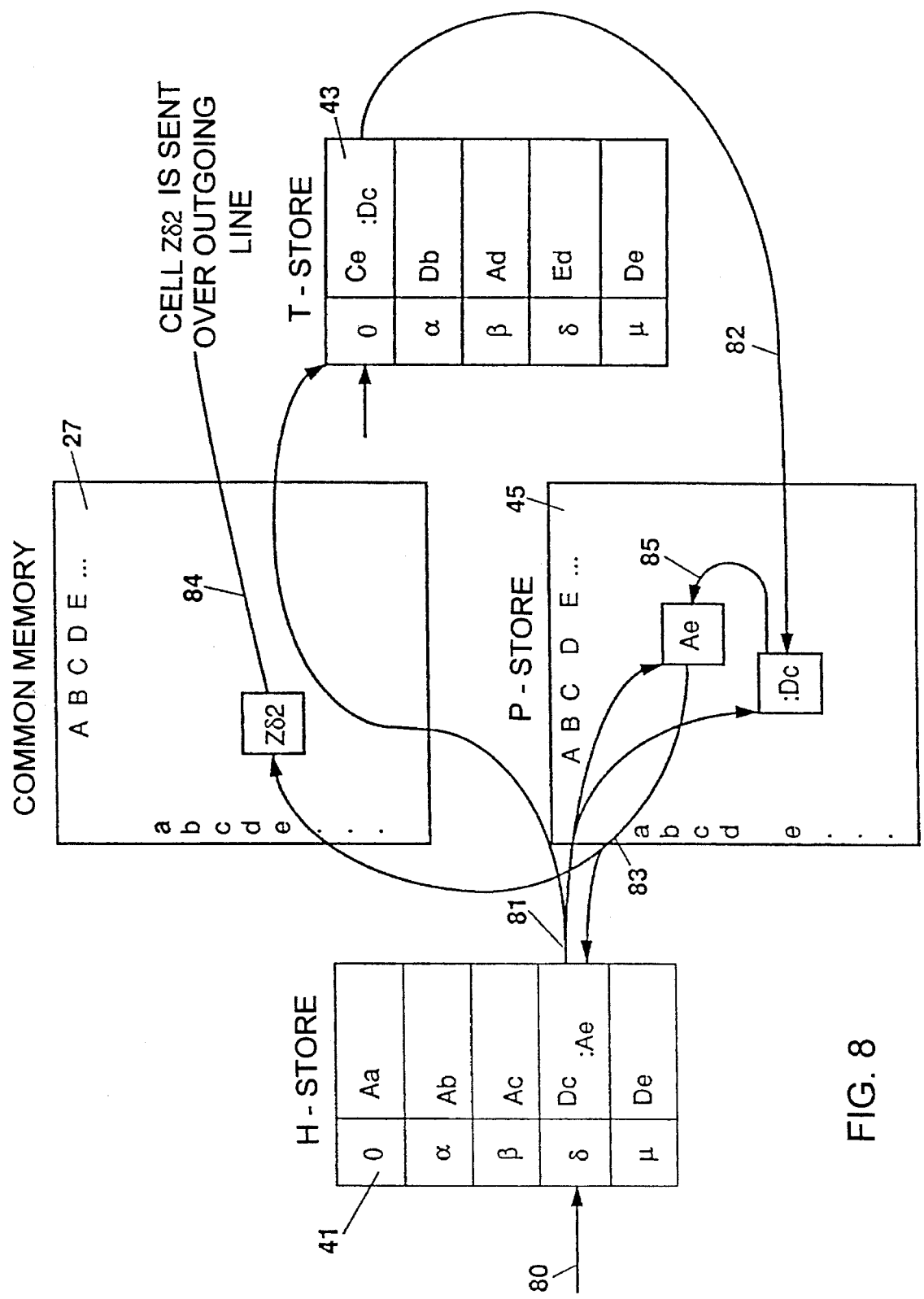

Continuing with the example presented in FIG. 5, FIG. 8 shows the procedure when sending out a cell Z from the common memory 27. Moreover, all the described stores 27, 41, 43, 45 are shown. Every fifth storage location from the example (FIG. 5) is shown in the corresponding H-store 41 and T-store 43. The addresses ($\alpha,\beta,\mu$) of these storage locations are associated with the correspondingly labelled outgoing lines 12 ($\alpha,\beta,\partial,\mu$). In addition is the address 0, for the list of empty locations. The sequencer 38 (FIGS. 2 and 3) is pointing at this moment in the H-store, to the storage location with the address $\partial$, as shown by the arrow 80.

The actual content of this storage location $\partial$, at the beginning of the reading-out process, is the address Dc. This address is read out of the H-store (arrow 81 ) and fed not only to the P-store 45, but also to the T-store 43. In the T-store 43, the current content of the storage location O (Ce) is hereby overwritten with Dc. This means that the address for the current tail element Ce is replaced by Dc. The new tail-element of the list of empty locations is therefore the address Dc. Before being overwritten, the earlier tail-element Ce is used to select the associated storage location Ce in the P-store 45 (arrow 82). The new address Dc is stored as the content of this storage location. Finally, the storage location Dc in the P-store 45 is selected (arrow 85) and its content (the address Ae) written into the H-store 41 location $\partial$, in place of the current value Dc (arrow 83). At the same time, the new address Ae is delivered as an address to the common memory 27. Hereby, the associated block in the common memory 27 is selected and its content, the cell $Z\partial 2$, sent out on the line $\partial$ of the outgoing lines 12 (arrow 84).

Through these procedural steps, the cell $Z\partial 2$, being the second oldest cell for the line $\partial$, is thus sent out as desired. Hereby, the block Dc in the common memory 27 becomes free. Dc becomes marked as the address of the new tail T, ie. as element 013 (FIG. 5) in the list of empty locations in the T-store 43. Furthermore, Ae becomes marked as the new head H of the list $\partial$ in the H-store.

The sequencer 38 can now step forward to the next storage location $\mu$ of the H-store 41, where the same procedural steps are performed, but now for the list $\mu$ and the line $\mu$ of the outgoing lines 12, whilst ever a list $\mu$ exists. According to the chosen example, however, this is not the case (the head and the tail of the list $\mu$ coincide) so that, in this case, a newly generated empty cell is sent out on the outgoing line $\mu$ (12).

Figure 9:
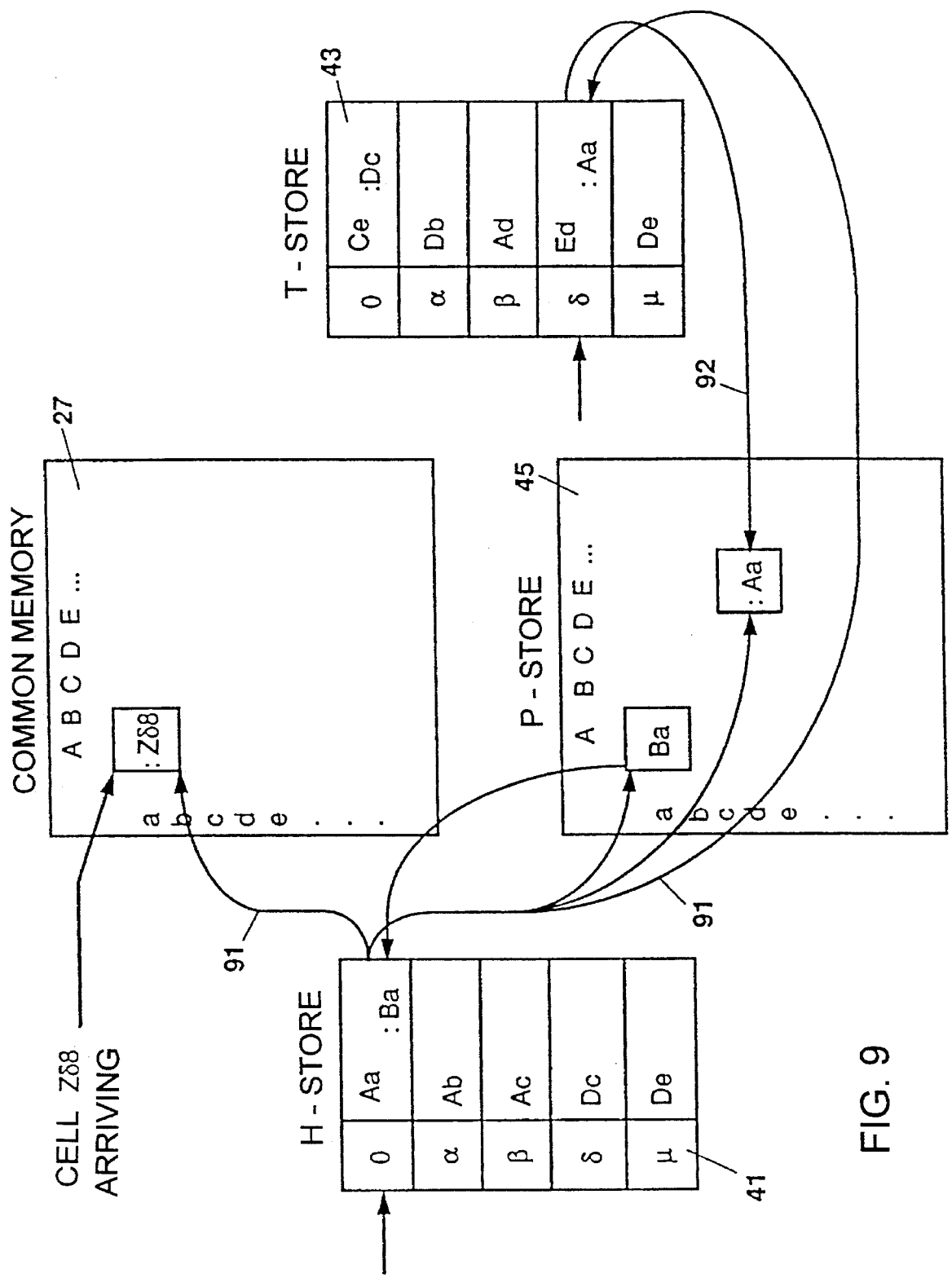

In the same way as for FIG. 8, FIG. 9 shows the procedure when storing an incoming cell Z in the common memory 27.

In this example, this cell should later be sent out on the outgoing line ∂. In this case, the address reading unit 33 informs the input logic (via the input 46) that the list ∂ is to be handled. After that, the input logic 48 arranges that the head of the list of empty locations O in the H-store 41 is extracted. This head contains the address Aa, which is used four times. The first use is to denote the address of the block in the common memory 27 in which the incoming cell Z∂8 should be stored. This is—as stated—the storage block at the address Aa. The cell Z∂8 now forms the new tail of the queue ∂ (FIG. 6). With this, the current head O1 of the queue of empty locations O is used, and is replaced with the new head O2 (the storage block with the address Ba).

The second use is in the T-store 43. In the storage location ∂, the stored address Ed is read out. This address indicates the associated storage location in the P-store 45 into which the address Aa is written (arrow 92).

For the third use, the address Aa is written in as the new content of the storage location ∂ of the T-store 43, thereby overwriting the current content Ed.

The fourth use of the address Aa is in the P-store 45, for the selection of the storage location Aa, and for reading the next address (in this example Ba) which is to be stored as the new content Ba of the storage location 0 of the H-store 41 (arrow 93).

Through these procedural steps, as desired, the new cell Z∂8 is written into the common memory 27, the herewith occupied block Aa is appended to the queue ∂ as the tail element Z∂8, and the queue of empty locations 0 is shortened by its head element Aa; whereby Ba becomes its new head. These steps are also controlled by the identified sequencer 38.

The control unit 35 described so far, is simple to construct. The common memory 27 serves exclusively for the intermediate storage of cells Z, and therefore has a clear basic function, which is independent of the physical realisation of the store. Without exception, all of the storage blocks can be used arbitrarily for any queue. Queues which are only empty occupy respectively a single storage block. In this way, the common memory 27 is used very efficiently.

Independent of the common memory 27, the P-store 45, the H-store 41 and the T-store 43 serve for the management of the storage blocks of this common memory. The lists O, α,β,∂,μ, which are build for this purpose are again an image of the queues in the common memory. New queues are easily initiated because a single storage location is provided for this purpose in every store 41, 43, 45. Furthermore, the P-store 45 can be accessed at any time via the monitor logic 71, e.g. for checking reasons or for tests, without affecting the common memory 27. Also, existing queues are allowed simply to connect to each other, e.g. for re-routing purposes, in the case of a disturbance.

The control unit 35 works together with a sequencer 38. In this way, the individual operation steps are very simply serially controlled, triggered or switched, like a type of selector. Consequently, the control unit 35 works in a straightforward manner and fast, whereby the storage- and control-functions are clearly separated.

Generally, it can be considered that basically, through the storing of a cell Z in the common memory 27, the queue of empty locations O in the P-store 45 is shortened by its respective tail element and the queue α,β,∂,μ, with which the cell is associated, is lengthened by a new head element. Conversely, the sending out of a cell Z from the common memory 27 causes respectively the lengthening of the queue of empty locations O by one element and a corresponding shortening of the queue α,β∂,μ with which the cell is associated.

If a list contains only a single element, and consequently the head H and tail T of the list have the same address, then this is detectable by the comparator 59 (FIG. 3) and the associated queue is considered as empty. In this case an empty cell is sent out on the respective associated outgoing line 12. On the other side, incoming empty cells are intercepted and deleted by the address reading unit 33 (FIG. 2). Therefore, both the P-store 45 and the common memory 27 partition themselves, in an arbitrary and fully flexible way, according to the requirements of the various lists or queues. In the most extreme case, the whole of the P-store can be occupied by a single list, or respectively the common memory 27 can comprise a single queue.

In conjunction with the list of empty locations O, is the fact that (as described using FIG. 8) when sending out a cell Z respectively, the current address stored in the storage location α,β,∂,μ of the H-store is not used for the selection in the common memory 27, but rather the respective newly stored address.

In order that lists can be created at all, a corresponding number of storage locations must be provided in the P-store 45 for the initiation. These storage locations each form a starting element for the lists α,β,∂,μ. The remaining storage locations stand ready for the list of empty locations. The control unit 35 uses its aforementioned monitor logic 71 (FIG. 3) in order to create such a start configuration. Any number of other configurations are also possible in place of the preferred configuration outlined.

The arrangement described up to now, operates exclusively with cells Z, which all have a single uniform priority. Therefore all these cells Z are treated equally. Hereafter, this principle is extended by the addition of a priority indicator, e.g. the indicator I, II, III, meaning "normal", "urgent" and "very urgent", in the current header of a cell Z. This means that, generally, a number p of distinguishable priorities are foreseen.

On account of the priority indicator I, II, III, every cell Z is now not only associated with an outgoing line 12, but also with the respective priority. In this way, in the common memory 27, competing queues of cells Z build up, which are to be sent out on the same respective outgoing line 12, whereby the principle of First-in/First-out is partly contravened.

The competing queues find their counterpart in competing lists in the P-store 45, in the manner described previously. On this point, the P-store 45 must not be modified in any way. However, it is necessary to extend the H-store 41 and the T-store 43 in such a way that every outgoing line 12 is not only associated with one single storage location, but with as many as there are allowed priorities I, II, III; for example three. Using the same expressions as in FIGS. 5 to 9, these storage locations are given the designations αI, αII, αIII, βI, βII . . . μIII. Therefore, instead of the previous [four +one] lists α,β,∂,μ+O, now [(four×three) +one] lists are present.

The way and means in which the lists are modified with the storing of an incoming cell Z in the common memory 27 remains exactly the same as before, except for the consideration of the respective priority indicators I, II, III.

On the other hand, the procedure for reading out stored cells Z from the common memory 27 requires a certain alteration, in that, during the cyclical consideration of all the outgoing lines 12, it must respectively be checked which of the respective competing queues should be shortened by one cell Z. In this respect, (using the outgoing line ∂ as an example) the following possibilities can be discerned:

all lists ∂I, ∂II, ∂III are empty; in this case an empty cell is sent out only one of the lists ∂II, ∂II, ∂III contain elements; in this case, the associated "oldest" cell Z∂ is read out of the common memory 27 and sent out.

two or three of the lists ∂I, ∂II, ∂III contain elements; in this case, the "oldest" cell Z is sent out from that queue which is associated with the list with the highest priority I, II, III.

Figure 10:
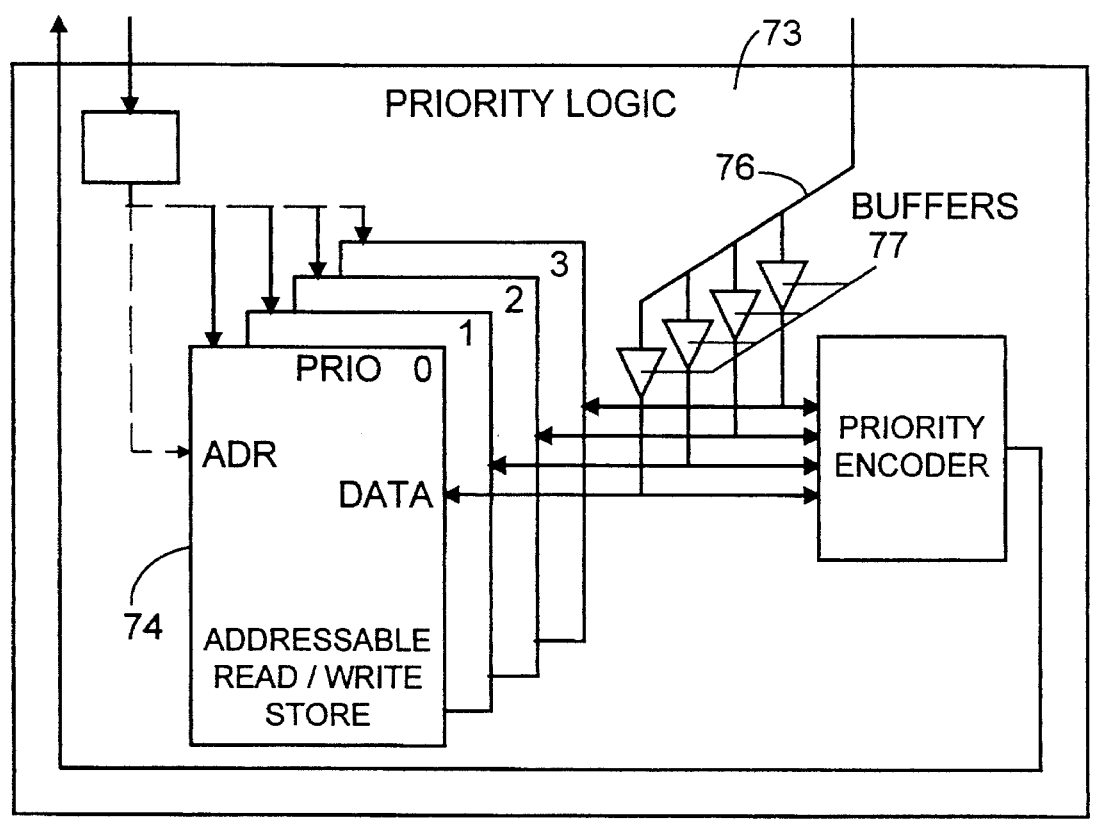

The priority logic 73 shown in FIGS. 3, 4, serves for monitoring the indicated possibilities and for the associated control of the reading out process. FIG. 10 shows the block diagram of this logic 73. It comprises an extra addressable read/write store 74, which contains a storage plane for each foreseen priority I, II, III. The number of addresses corresponds to the number m of outgoing lines 12. The content n of the store for a given address in one of the planes indicates respectively whether or not the list for the corresponding outgoing line 12 and the corresponding priority is empty.

After every insertion or removal of an element into/from a list (with the exception of the list of empty locations O), the head H and the tail T of this list are compared in the comparator 59 (FIG. 3). The result is written into the storage location of the extra store 74, at the address which corresponds to the respective outgoing line and in the plane with the corresponding priority. The respective comparison signal from the comparator 59 enters via the input 76 and unidirectional input elements 77 (buffers).

The selection of the respective highest priority, non-empty list for an outgoing line 12 is done by way of putting its address, e.g. ∂III, on all planes of the store 74, and reading out the associated values in parallel. Therefrom, a priority encoder 75 determines the corresponding priority values I, II, II which, together with the line identification ($\alpha,\beta,\partial,\mu$) determines the correct corresponding list.

The described priority logic 73 requires a relatively small effort and works in such a way that no more processing time ensues in the case that some of the priority values I, II, III, are not present. The ATM-node can therefore operate just as fast, with or without priorities.

A further extension of the control unit 35 relating to this invention, is the multicast facility. This permits exactly the same cell to be sent out, one after the other, on several outgoing lines 12. The particular lines are, of course, predeterminable. This extension is important, for example, for the distribution of television pictures and has a high priority value, which is respectively treated by the described priority logic 73.

Figure 11:
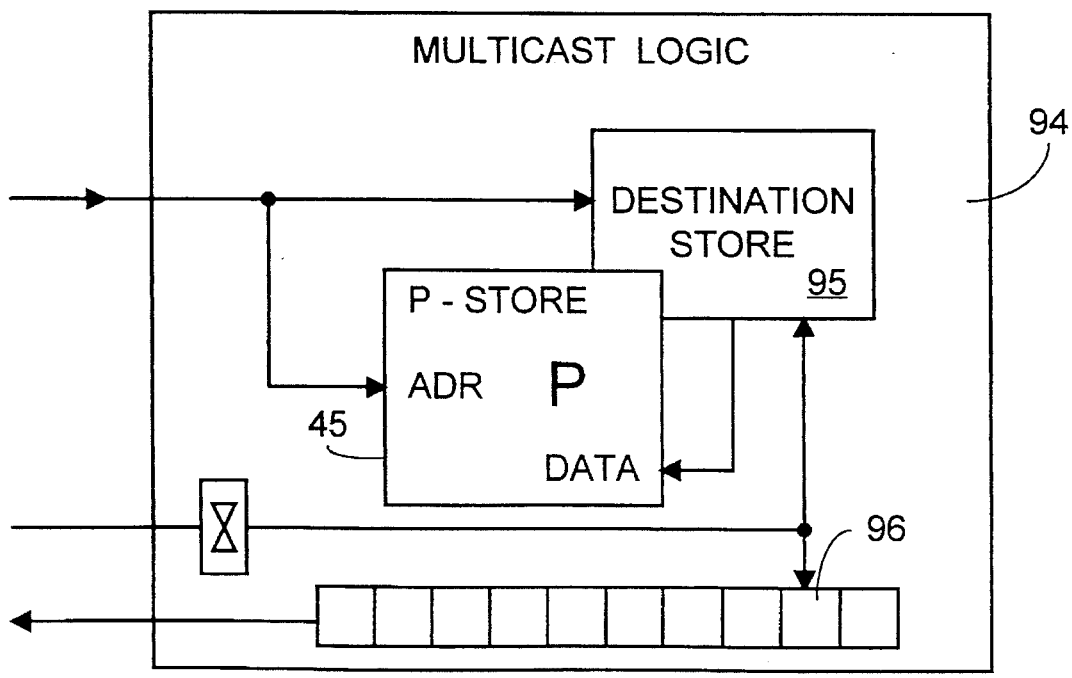

FIG. 11 shows the block diagram of the multicast logic 94. This logic comprises an additional addressable read/write store 95, which is hereafter termed the destination store. This destination store 95 is arranged in parallel to the P-store 45 and has the identical addressing range as the P-store.

Associated with the destination store 95, is a table of the outgoing lines 12 to be served. Moreover, for each element of this table, the destination store 95 has a content which is an appertaining destination word D with a length of r bits. Every bit of the word D indicates whether or not the respective multicast cell Z has to be sent out on the respective outgoing line 12 with this number. Together, all multicast cells Z form a queue, which is associated with a multicast list in the P-store 45.

The destination words D are passed to, the control unit 35, together with the list number for multicast cells, by the address reading unit 33 (FIG. 2).

Whilst ever the list of multicast cells is not empty, the destination word D of the oldest multicast cell is written into a shift register 96 at the beginning of a cell period. The individual bits of this destination word D are chosen in such a way that, for every outgoing line 12, the information whether or not the multicast cell has to be sent out, together with the information from the priority stores 74 (FIG. 10), is fed to the priority encoder 75, where it is treated with the highest priority value I, II, III.

The same information is fed to the common memory 27, where it enables the choice to be made between a normal header H and a special header for multicast cells and outgoing line 12.

The multicast facility can be extended or complemented to a broadcast facility, by the so-called broadcast cells R which are respectively sent out in parallel on all outgoing lines 12. For this, it is only necessary to have one single block in the respective common memory 27 for the storing of this respective broadcast cell.

The control unit 35 relating to this invention has the following properties and advantages:

Its operation is independent of the first plurality n of incoming lines 11 and is easy to adjust to suit the second plurality m of outgoing lines 12. In this respect, merely the number of storage locations in the H-store 41 and the T-store 43 has to be altered. This is possible merely through software, via the control of either the sequencer 38 or a pointer controller associated with the stores 41, 43.

The number of storage locations present in the H-store 41 and in the T-store 43, as well as the number of lists contained in the P-store 45 can be in the range between just a few up to about forty, whereby this number is only limited by the speed of operation that is demanded and the available technology.

The control unit 35 is easily adjustable to every size of common memory 27, which can range from perhaps fifty up to several hundred blocks.

It is also important that the control unit 35 can be configured and adjusted to the respective requirements through logical units, which have not been described. This applies particularly to the extensive number of freely selectable types of initialization.

The H-store 41, the T-store 43, and the P-store 45 are commercial types of addressable read/write stores, preferably RAMs (random access memories). However, other types of store are imaginable, e.g. other semiconductor stores or core stores.

The H-store 41 and the T-store 43 can be so arranged that they contain only the head H or the tail T of the lists $\alpha,\beta,\partial,\mu$ associated with the outgoing lines 12, not however the list of empty locations O. The lists of empty locations 0 can then be placed in separate, additional stores, which can be advantageous for practical reasons.

The three stores 41, 43, 45 can be constructed as one single store, whose storage locations are partitioned such that three domains are formed, which imitate the three stores 41, 43, 45.

The control unit 35 is largely independent of the length of the cells Z and from the type of the addresses for the common memory 27. However, it must operate so fast that all the procedural steps described through FIGS. 8 and 9, and possibly others, can be completed respectively in the transmission time of one cell Z. Still to be taken into account in this respect, is the fact that in this time, the storing of one cell into the common memory 27 and the sending out of another cell from this memory must be carried out simultaneously. At present, 2 to 3μS is identified as an approximate value for the transmission time of one cell, Alongside the advantages of the control unit 35 that have already been identified, the special flexibility that this unit 35 brings to the respective ATM-node 10 must, above all, again be mentioned. Thus, it can not only be equipped for the main function of "the onward routing of cells Z to their destination", but it can also be equipped for the distinct fast onward routing of cells on the basis of priority values, for the "parallel" onward routing of cells on several outgoing lines 12, for the diversion of cells in cases of disturbances, for the alteration of priority values, for the installation of new lists or the deletion of existing lists and/or for the possibility to monitor and diagnose all—or special selectable—lists at any time.

We claim:

1. A control unit for the control of the common memory of an ATM-node, said ATM-node is connected to a first plurality of incoming lines and to a second plurality of outgoing lines, said ATM-node serves for the continuous reception and onward routing of address-labelled cells with uniform length and uniform construction, said cells arrive or leave over the incoming lines and the outgoing lines, respectively, and said cells having a quantity of distinguishable priorities associated therewith, said common memory serves for the intermediate storage of all said cells, which will be sent out on one of said outgoing lines, said common memory has a third plurality of storage blocks, which are individually selectable by addresses and each of which services respectively for the reception of a said cell, said control unit comprising:

means for management and control and a sequencer for managing said storage blocks of said common memory and for controlling the sequential reading in and reading out of said cells, respectively, into or out of said storage blocks, wherein said means for management and control comprises at least one addressable read/write store, a monitor logic, an input logic, a bus- and control-logic, and a comparator, said read/write store comprising a total number of storage locations, said total number corresponding to said third plurality plus two times said second plurality multiplied by said quantity, plus 2;

wherein every said storage location of said read/write store is constructed for storing an address, twice of said second plurality of said storage locations multiplied by said quantity is associated in pairs with said outgoing lines, and said third plurality of said storage locations is associated with said storage blocks of said common memory, and that two of said storage locations are associated with the empty ones of said storage blocks of said common memory.

2. The control unit according to claim 1 wherein there are three said addressable read/write stores, the first and the second of said three read/write stores are constructed identically, said first and second stores have a first number of storage locations equal to said second plurality multiplied by said quantity, plus 1, said first number of storage locations are associated in pairs and individually with said outgoing lines and with said priorities and are associated with said empty storage blocks of said common memory and said first and second stores are individually controllable, and said third read/write store has a second number of storage locations equal to said third plurality, said second number of storage locations are addressed equal to said storage blocks of said common memory.

3. The control unit according to claim 2, wherein the contents of said storage locations of said first read/write store, said storage locations are associated with said outgoing lines and said priorities, are addresses, said addresses form the start of lists, said lists are individually associated with said outgoing lines and said priorities, the contents of said one storage location of said first read/write store is a first address, said one storage location is associated with said empty storage blocks of said common memory, said first address forms the start of a list of available said storage locations in said third read/write store, the contents of said storage locations of said second read/write store, said storage locations are associated with said outgoing lines and said priorities are addresses, said addresses form the end of said lists, said lists are associated with said outgoing lines and said priorities, said contents of said one the storage locations of said second read/write store is a second address, said one storage location is associated with said empty storage blocks of said common memory, said second address forms the end of said list of said available storage locations in said third read/write store, the contents of the occupied said storage locations of said third read/write store are addresses, said addresses form the elements of said lists, which said lists are associated with said outgoing lines and said priorities, in such a manner, that every said address denotes in which said storage location of said third store the next respective said element of said respective list is stored, and the contents of said available storage locations of said third read/write store are addresses, said addresses together form the elements of said list of said available storage locations, in such a manner, every said address denotes in which said storage location of said third store the next respective element of said list is stored, in total, in such a manner, that, all said lists together with their elements occupy all said storage locations of said third read/write store.

4. The control unit according to claim 3, wherein every said element that is stored at a given said address in one of said storage locations of said third read/write store and that belongs to said list is associated with said cell, said list is associated with said outgoing line and said priority, said cell is stored at the same said address in said associated storage block of said common memory and said cell is envisaged to be sent out on the respective said outgoing line, and every said element of said list of said available storage locations in said third read/write store is associated with an empty said storage block in said common memory.

5. The control unit according to claim 1 further comprising a pointer controller, said pointer controller determines said storage locations of said first read/write store and of said second read/write store, said first and second read/write stores are associated with the same said outgoing line and the same said priority.

6. The control unit according to claim 1, wherein said read/write stores are RAMs (random access memories).

7. The control unit according to claim 1, wherein said bus- and control-logic has at least one bus, said bus is connected via control elements such as transceivers and multiplexers, to other control units.

8. The control unit according to claim 1 further comprising an output for connecting said control unit to said common memory, at least one output buffer preceding said output.

9. The control unit according to claim 1 further comprising a priority logic, said priority logic is connected to said first and to said second read/write stores and is connected via a comparator to said bus- and control-logic, and said priority logic has a number of access stores, said number of acccess stores being equal to said quantity of said priorities and has a priority encoder.

10. The control unit according to claim 9, further comprising a multicast logic, said multicast logic is connected to said third read/write store and to said priority logic, and said multicast logic has a destination store and a shift register.

11. A method for the operation of an ATM-node,
said ATM-node continuously receives address-labelled cells of uniform length and uniform construction, arriving from a first plurality of incoming lines, brings the received said cells into a serial order through time multiplexing, reads the addresses of said cells, and stores said cells into the storage blocks of a common memory, said method comprising the steps of:
continuously reading out said cells from said common memory,
sending said cells on associated outgoing lines according to said addresses and priorities of said cells, said cells belong to a second plurality,
forming queues individually associated with said outgoing lines and said priorities, wherein the elements of said queues are said cells having the same said priority, said cells are stored in said common memory and said cells are envisaged to be sent out on the same outgoing line, respectively,
associating a list to every said queue and to all empty said storage blocks of said common memory, respectively,
wherein said lists have designed head elements and tail elements, the elements of said lists are addresses, and
wherein the total of all said elements of all said lists is constant and is equal to the number of said storage blocks of said common memory,
appending a current head element of said list of said empty storage blocks as a new tail element of said list of empty storage blocks when storing a cell to common memory, and
appending a current head element of a list associated with a queue in the common memory as a new tail element of said list of empty storage block is when reading out said cell from said queue in said common memory.

12. The method according to claim 11, wherein all said elements of said lists are associated with addresses, all said addresses are different and fundamentally no said element has said address, said address is equal to this said element.

13. The method according to claim 12 wherein the total of said addresses of said elements of said lists is equal to the total of said elements of said lists and is equal to said addresses of said storage blocks of said common memory.

14. The method according to claim 11 wherein said lists, which are associated with said outgoing lines, are selected cyclically, from all said lists which are associated with the same said outgoing line, non-empty said list is selected, which is associated with the highest said priority, respectively, and that said head element of this said respective list indicates that said storage block of said common memory, whose stored said cell should next be read out.

15. A control unit for the control of a common memory of an ATM-node, the ATM-node being connected to a first plurality of incoming lines and to a second plurality of outgoing lines and serving for the continuous reception and onward routing of address-labelled cells with uniform length and uniform construction, the cells arriving over the incoming lines and leaving over the outgoing lines, the cells having a quantity of distinguishable priorities associated therewith, the common memory having a third plurality of storage blocks, the storage blocks being individually selectable by addresses and serving for the storage of cells, the common memory serving for the intermediate storage of all of the cells which will be sent out on the outgoing lines, the control unit comprising:
means for management and control of the storage blocks of the common memory comprising:
an addressable read/write store having a number of storage locations,
a monitor logic,
an input logic,
a bus- and control-logic, and
a comparator; and,
a sequencer for sequentially reading in and reading out of each of the cells, respectively, into or out of the storage blocks;
wherein the number of storage locations in the read/write store is governed by the equation:

$$X=k+2mp+2,$$

where X represents the number of storage locations in the read/write store, k represents the third plurality of storage blocks in the common memory, m represents the second plurality of outgoing lines, and p represents the quantity of distinguishable priorities,
wherein each storage location of the read/write store is adapted for storing an address,
wherein the number of storage locations are associated in groups of 2p with each of the outgoing lines and,
wherein two of the storage locations are associated with empty storage blocks of the common memory.

16. The control unit according to claim 15, wherein the read/write store comprises first, second and third addressable read/write sub-stores,
the first and the second read/write sub-stores each have a first number of storage locations governed by the equation:

$$Y=mp+1,$$

where Y represents the first number of storage locations in each of the first and second sub-stores, m represents the second plurality of outgoing lines, and p represents the quantity of distinguishable priorities, the storage locations are associated with the empty storage blocks of the common memory, and the first and second sub-stores are individually controllable, and
the third read/write sub-store has a second number of storage locations equal to the third plurality of storage blocks in the common memory, the second number of storage locations are addressed exactly as the storage blocks of the common memory.

17. The control unit according to claim 16 wherein the storage locations of the first sub-store are adapted to store addresses indicative of the starts of lists, each of the lists are individually associated with the outgoing lines and the priorities, one storage location of the first read/write sub-store is associated with the empty storage blocks of the common memory, the one storage location of the first read/write sub-store is adapted to store an address indicative of the start of a list of available storage locations in the third read/write sub-store, wherein the storage locations of the second read/write sub-store are adapted to store addresses indicative of the ends of the lists, one storage location of the second read/write sub-store is associated with the empty storage blocks of the common memory, the one storage location of the second read/write sub-store is adapted to store an address indicative of the end of the list of the available storage locations in the third read/write sub-store, the storage locations of the third read/write sub-store are adapted to store addresses, the addresses form the elements of the lists associated with the outgoing lines and the priorities so that every address indicates in which storage location of the third read/write sub-store the next respective element of the respective list is stored, and every address denotes in which storage location of the third read/write sub-store the next respective element of the respective list is stored, in total, in such a manner, that all the lists, together with their elements, occupy all the storage locations of the third read/write sub-store.

18. The control unit according to claim 16 wherein each element that is stored at an address in a storage location of the third read/write sub-store and that belongs to a list is associated with a cell, the cell is stored at the same the address in the associated storage block of the common memory and the cell is adapted to be sent out on the respective the outgoing line, and that each element of the list of the available storage locations in the third read/write sub-store is associated with an empty storage block in the common memory.

19. The control unit according to claim 15 further comprising:

a pointer controller, the pointer controller determines the storage locations of the first read/write sub-store and of the second read/write sub-store, the read/write sub-stores are associated with the same the outgoing line and the same the priority.

20. The control unit according to claim 15 wherein the read/write sub-store is a RAM (random access memory).

21. The control unit according to claim 15 wherein the bus- and control-logic has at least one bus connected via control elements such as transceivers and multiplexers, to other units.

22. The control unit according to claim 15 further comprising:

a connector for connecting the control unit to the common memory, and at least one output buffer preceding the connector.

23. The control unit according to claim 15 further comprising:

a priority logic, the priority logic is connected to the first and to the second read/write sub-stores and is connected via a comparator to the bus- and control-logic, and the priority logic has a number of access stores, the number of access stores is equal to the quantity of priorities, and the priority logic has a priority encoder.

24. The control unit according to claim 23 further comprising:

a multicast logic connected to the third read/write sub-store and to the priority logic, and the multicast logic has a destination store and a shift register.

25. A method for the operation of an ATM-node that continuously receives address-labelled cells of uniform length and uniform construction from a first plurality of incoming lines, brings the received the cells into a serial order through time multiplexing, reads the addresses of the cells, and stores the cells into the storage blocks of a common memory, continuously reads out the cells from the common memory, and, according to the addresses and priorities of the cells, sends out the cells on a second plurality of associated outgoing lines, queues are formed and are individually associated with the outgoing lines and the priorities and the elements of the queues are cells having the same priority the cells are stored in the common memory and adapted to be sent out on the outgoing line, comprising the steps of:

providing lists for each queue and empty storage blocks of the common memory, each list having a head element and a tail element, the elements of the lists are addresses, and the total of all the elements of all of the lists is constant and is equal to the number of the storage blocks of the common memory, appending a current head element of the list of the empty storage blocks as a new tail element of the list of empty storage blocks when storing a cell to the common memory, and appending a current head element of a list associated with a queue in the common memory as a new tail element of the list of the empty storage blocks.

26. The method according to claim 25 wherein all elements of the lists are associated with addresses, all the addresses are different, and fundamentally no element has an address, which address is equal to this the element.

27. The method according to claim 26 wherein the total of the addresses of the elements of the lists is equal to the total of the elements of the lists and is equal to the total of the addresses of the storage blocks of the common memory.

28. The method according to claim 25 further comprising the steps of:

selecting the lists which are associated with the outgoing lines from all the lists which are associated with the same the outgoing line, in a cyclical fashion, and, the selecting from non-empty lists elements associated with the highest of the priorities whereby the head element of the respective list indicates that the storage block of the common memory, whose stored the cell should next be read out.

* * * * *